April 22, 1952 C. C. S. LE CLAIR 2,594,040
NIPPLE OR LUBRICANT RECEIVING DEVICE
Filed July 20, 1948 3 Sheets-Sheet 1

Inventor:
Camille Clare Sprankling LeClair
By Hackle, Horton, Allberg, Hanamond Kupper
Attys.

April 22, 1952     C. C. S. LE CLAIR     2,594,040
NIPPLE OR LUBRICANT RECEIVING DEVICE
Filed July 20, 1948     3 Sheets-Sheet 2

Inventor:
Camille Clare Sprankling Le Clair
By Hinkle, Horton, Ahlberg, Hansmann & Kupper
Attys.

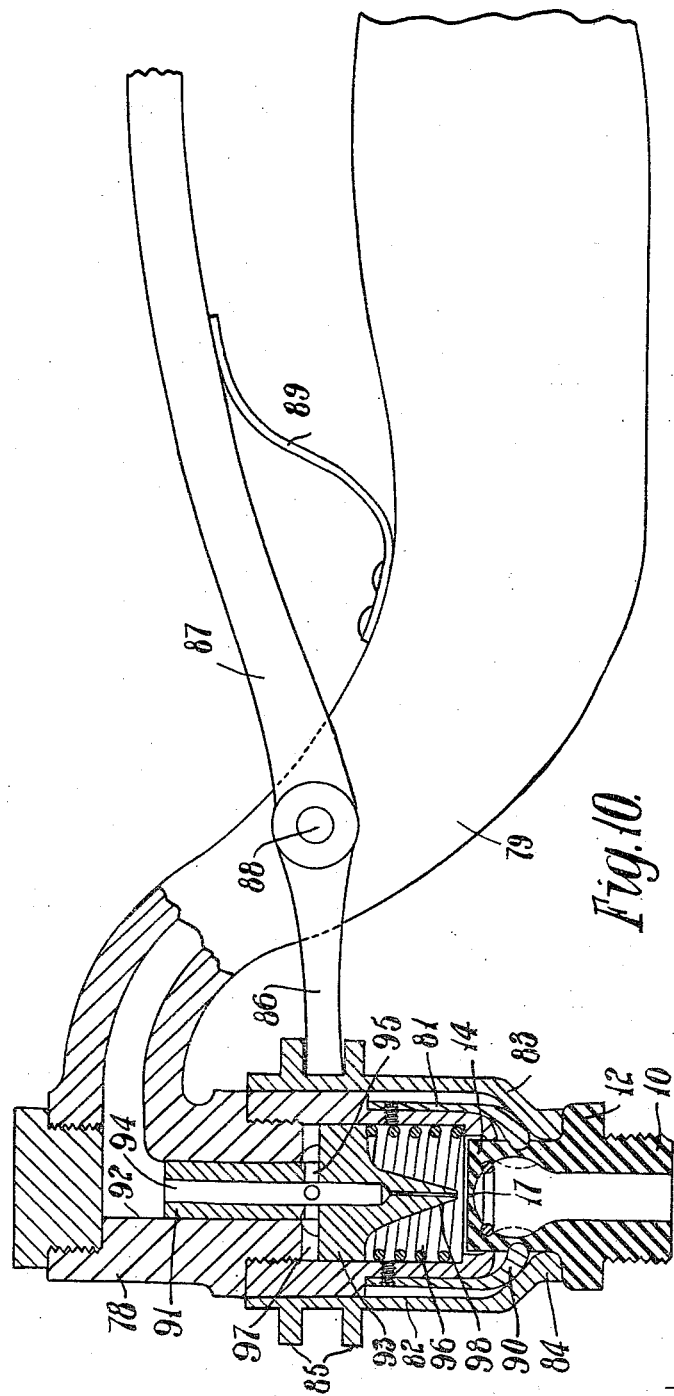

Patented Apr. 22, 1952

2,594,040

UNITED STATES PATENT OFFICE 2,594,040

NIPPLE OR LUBRICANT RECEIVING DEVICE

Camille Clare Sprankling Le Clair, London, England, assignor to Tecalemit Limited, Brentford, England, a corporation of Great Britain Application July 20, 1948, Serial No. 39,729
In Great Britain July 25, 1947

11 Claims. (Cl. 184—105)

This invention relates in general to nipples or lubricant-receiving devices (hereinafter called "nipples") for use in lubrication systems with grease gun, or equivalent, nozzles and which are so constructed that dirt cannot collect in their lubricant-receiving passages.

In my co-pending application No. 37,994 which has matured into Patent Number 2,546,672, I have described and claimed a number of resilient, lubricant-impervious closure members or teats some of which were adapted to act as closures for the inlet ends of lubricant supply passages formed in rigid nipples and some of which themselves formed complete nipples which were adapted to act as closures for the inlet ends of lubricant supply passages formed in bearings or other places of use. Each of these closure members or teats included a body part comprising a shank which was adapted to be fixed in the said lubricant supply passage, a nozzle-engaging head, and a lubricant passage in the form of a hole of no measurable diameter or one or more slits of no measurable width, such that there was no exposed aperture or space in the closure member or teat in which dirt could collect. The said nozzle-engaging head was so formed that when the closure member or teat was in its working position in the said lubricant supply passage pressure, applied in the axial direction by the nozzle of a grease gun to the outer surface of the said nozzle-engaging head around, and at a position spaced laterally from, the inlet end of the said lubricant passage in the closure member or teat, caused the head to be distorted or deflected in such a manner that the inlet end of the said lubricant passage was opened or spread initially to allow the entry of an injector device, whereby lubricant under pressure fed into the injector device might be forced through the lubricant passage into the bearing or other place of use.

The object of the present invention is to provide resilient closure members or teats which are similarly provided with normally-closed lubricant passages of small size of no measurable diameter or width but which are so constructed that by thrust applied to them in the radial direction the inlet ends of the said passages may be pulled open initially, so as to permit of the entry of lubricant injector devices which form parts of the nozzles of grease guns and through which lubricant may be injected under pressure into the said passages and thence to the places of use of the lubricant.

Like those described and claimed in the said specification resilient closure members or teats according to this invention have the advantage that their outer surfaces, which inevitably are dirt-laden, are pulled away from the mouths of the said lubricant passages so that the said injector devices enter clean surfaces and do not, (as in known types of nipples) push dirt into those passages.

The present invention provides a resilient lubricant-impervious closure member or teat which is constructed so as to act either as a closure for the inlet end of a lubricant supply passage formed in a hollow rigid nipple having a body part including a projecting, teat-receiving collar or sleeve, or which, alternatively, is constructed so as to form a complete nipple which is adapted to act as a closure for the inlet end of a lubricant supply passage formed in a bearing or other member upon which the closure member is mounted, the said closure member or teat either being in the form of a hollow cap adapted to be mounted upon the said rigid nipple collar or sleeve, or itself constituting a nipple comprising a body part, a shank, by means of which the closure member or teat may be fixed in the said lubricant supply passage in the bearing or other member upon which the closure member is mounted (hereinafter called "bearing") and a nozzle-engaging head, the closure member or teat in either case being formed with a normally-closed lubricant passage in the form of a hole of no measurable diameter or one or more slits of no measurable width, the arrangement being such that pressure applied by the nozzle of a grease gun radially or laterally to the outer surface of the side of the said cap or the nozzle-engaging head causes the cap or the head to be distorted or deflected in such a manner that the inlet end of the said lubricant passage in the cap or nozzle-engaging head is pulled open initially to allow the entry of a lubricant injector device, whereby lubricant under pressure fed into the injector device may be forced through the lubricant passage in the closure member or teat and thence to the bearing or other place of use.

Rigid means adapted to act as a fulcrum may also be provided whereby, when lateral or radial pressure is applied to the material at the side of the closure member or teat below the said means and the material is thereby forced inwards, the material above and radially inwards of the said means is forced outwards by leverage effects, and the inlet end of the said lubricant passage in the closure member or teat is thereby opened.

In one constructional form, the closure member or teat is in the form of a hollow cap adapted to be mounted upon the teat-receiving sleeve of a hollow rigid nipple body part, the said cap being formed with an internal recess which is of such a size relative to the said sleeve that a closed annular space is left between the latter and the wall of the said cap. The said recess is so shaped that when the cap is fitted upon the said sleeve the upper end of the latter engages in a groove in the cap and thus acts as a fulcrum about which a leverage effect can take place so that when lateral or radial pressure is applied to the side of the cap it will cause the material of the cap surrounding the said recess to be forced inwardly and thereby the material of the upper end of the cap to be spread, thus pulling open the inlet end of the lubricant passage in the closure member or teat.

The rigid nipple body part is provided with external locating means, such as a laterally-projecting flange, which not only serves as a stop against which the nipple is screwed but also acts to limit the extent to which the nozzle of the grease gun can be engaged over the resilient closure member or teat.

In an alternative construction, however, the closure member or teat itself forms a complete nipple adapted to act as a closure member for the said lubricant supply passage in the bearing and which comprises a body part a shank by which it may be fixed in the said lubricant supply passage and a nozzle-engaging head, which is formed with an internal recess terminating short of the upper surface of the said head and thus provides a comparatively thin wall through which is formed a normally-closed lubricant passage in the form of a hole of no measurable diameter or one or more slits of no measurable width. In a preferred nipple of this construction a rigid reinforcing ring is fitted in the said recess and acts as a fulcrum around which the material of the head moves so that the inlet end of the lubricant passage in the head is opened by a leverage effect when lateral pressure is applied to the side of the said head.

Locating means, corresponding to those provided in the rigid nipple construction, and comprising a laterally projecting flange, are also provided in this construction, for the same purpose, viz to locate the nipple on the bearing and to limit the amount of engagement of the nozzle over the head.

Two constructional forms of nipples constructed in accordance with the present invention, and several forms of nozzles adapted to be used with nipples made according to the invention are shown, by way of example, on the accompanying drawings, wherein.

Figure 2:
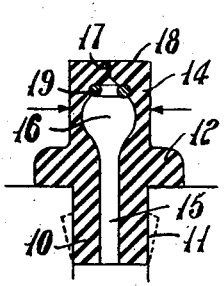
Figure 2 is a sectional view of a closure member or teat which is made of resilient, lubricant-impervious material and which itself forms a nipple adapted to be fitted in a lubricant supply passage in a bearing.
Figure 6:
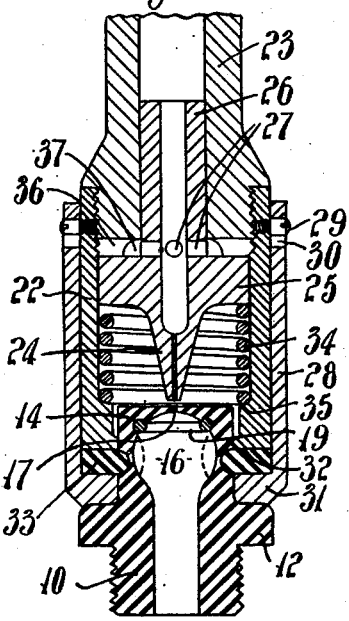
Figure 7:
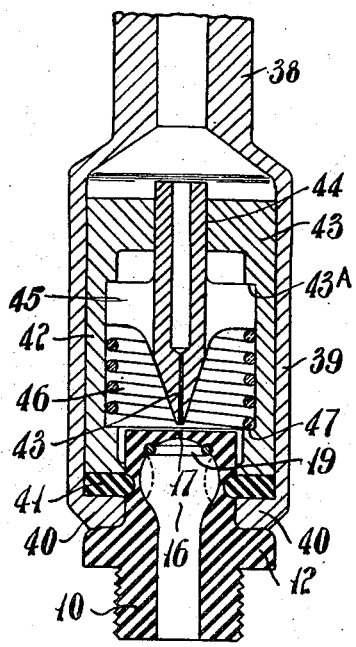
Figure 8:
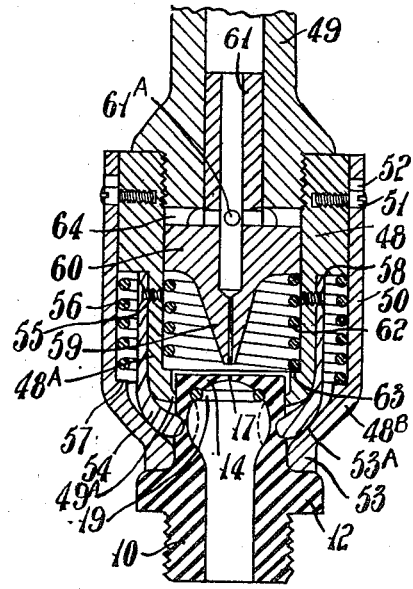
Figure 9:
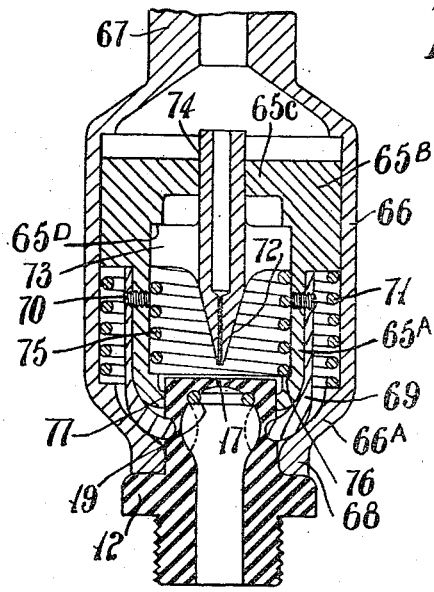

Figure 6 is a sectional view of a grease gun nozzle applied to a nipple as shown in Figure 2, the nozzle comprising an injector device which is operated by the pressure of the grease in the nozzle, and a flexible ring which embraces the nozzle-engaging head of the nipple and is adapted to distort the head so as to open the inlet end of the lubricant passage under the action of manual pressure applied to the nozzle;

Figure 7 is a sectional view of a second nozzle applied to a nipple as shown in Figure 2, the nozzle comprising an injector device which is operated by the pressure of the grease in the nozzle, and a flexible ring which embraces the nozzle-engaging head of the nipple and which is adapted to distort the head so as to open the inlet end of the lubricant passage under the action of the grease pressure;

Figure 8 is a sectional view of a third nozzle applied to a nipple as shown in Figure 2, the nozzle being similar in construction and operation to that shown in Figure 6 but including a number of laterally-movable jaws for distorting the said nozzle-engaging head;

Figure 9 is a sectional view of a fourth nozzle applied to a nipple as shown in Figure 2, the nozzle being similar in construction and operation to that shown in Figure 7, but including a number of laterally-movable jaws for distorting the said nozzle-engaging head; and Figure 10 is a sectional view of a fifth nozzle applied to a nipple as shown in Figure 2, the nozzle comprising an injector device which is operated by the pressure of the grease in the nozzle, a number of laterally-movable jaws which are adapted to engage around and distort the nozzle-engaging head of the nipple, and means, including a slidable sleeve and a pivoted operating lever, for moving the jaws into and out of their operative positions in which they act to distort the said head.

For convenience of description, hereinafter it will be assumed that the nipples and nozzles are arranged vertically.

Figure 1:
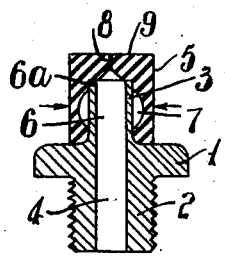
Figure 1 is a sectional view of a nipple which comprises a rigid body part fitted with a closure member or teat of resilient, lubricant-impervious material which is in the form of a hollow cap provided with a lubricant passage in the form of a hole of no measurable diameter.

Referring first to Figure 1:

The nipple comprises a metallic or other rigid body part having a locating flange or head 1, which may be shaped for engagement by a spanner, and a shank 2 which is threaded externally to screw into a threaded hole on the bearing (not shown). The nipple body part also comprises a relatively thin integral teat-receiving sleeve 3 which projects upwardly from the flange 1. The nipple body part is also formed with a bore 4 which forms a lubricant supply passage through which the lubricant under pressure is supplied to the bearing.

The nipple also comprises a lubricant-impervious teat of resilient material, such as rubber or synthetic rubber, which is in the form of a hollow cap or thimble 5 having a central pear-shaped recess 6 which is so shaped and positioned that when the teat is fitted over the sleeve 3 the upper edge of the sleeve engages in a groove 6a near the upper end of the recess and an annular space 7 is formed around the outside of the sleeve between it and the material of the teat surrounding it.

A small central hole 8, which is of no measurable diameter and is normally closed, is formed, as by piercing, through the relatively thin material lying between the top surface 9 of the closure member or teat and the upper end of the recess 6.

As will be described hereinafter, the radial thrust exerted by the grease gun nozzle is applied externally of the cap 5, at a point indicated by the arrow, opposite to the annular space 7 and the inlet end of the small size hole 8 is opened by a leverage effect about the upper edge of the sleeve 3, which thereby acts as a fulcrum.

Referring to Figure 2, in this construction the resilient closure member or teat itself forms a complete hollow nipple, which comprises a shank 10 which is adapted to be press-fitted or bonded or otherwise fixed in a hole 11 formed in the bearing. The nipple also comprises an annular locating shoulder or flange 12 which, when the nipple is fitted in its working position, is seated upon the top surface 13 of the bearing, and an integral nozzle-engaging head part 14 which projects upwards from the top surface of the flange.

The nipple is formed with a plain cylindrical lubricant supply passage 15 which at its upper end communicates with a pear-shaped recess 16 shaped like the recess 6 in the closure member or teat shown in Figure 1. A small central hole 17, which is of no measurable diameter and is normally closed, is formed as by piercing through the relatively thin material lying between the top surface 18 of the closure member or teat and the upper end of the recess 16.

In this construction also, the lateral thrust of the grease gun nozzle is applied upon and externally of the head 14, at a point indicated by the arrow, opposite to the recess 16. The leverage effect required to open the inlet end or mouth of the hole 17 is obtained in this case, however, by fitting a rigid reinforcing ring 19 which acts as a fulcrum, in a groove in the conical surface forming the upper end of the recess 16.

Figure 3:
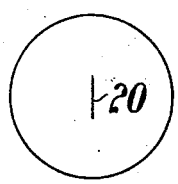
Figures 3 to 5 are plan views of modified closure members or teats in which the normally-closed lubricant passage is formed by one or more slits of no measurable width.
Figure 4:
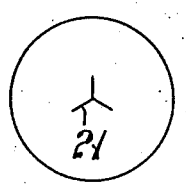
Figure 5:
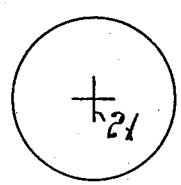

Each of the above constructions has been described as having a central lubricant passage in the form of a hole of no measurable diameter but it will be appreciated that this passage may also take the form of a linear slit 20 as shown in Figure 3 or it may be star-shaped having three or more radial arms 21, as shown in Figures 4 and 5. In all cases, however, the slits are preferably knife-cut (not sawn) and thus have no measurable width.

Any type of nozzle may be used in association with the nipples provided by this invention as long as it comprises means for applying the lateral or radial thrust to the outer surface of the closure member or teat required to spread the inlet end of the small size lubricant passage and an injector device having a pointed end adapted to enter the opened end of the said passage.

Figures 6 to 10 each show a nozzle suitable for use with any of the nipples, although each nozzle is shown in its working position upon a nipple as shown in Figure 2.

Referring to Figure 6, a sleeve 22 is screwed on to the hollow shank 23 of the grease gun. The hollow grease injector device comprises a pointed end 24 integral with a piston part 25, which is slidable in the sleeve 22, and a hollow guide shank 26 which is slidable in the bore of the grease gun shank 23 and is formed with a number of lateral ports 27. A second sleeve 28 is slidably arranged upon the outside of the sleeve 22, its slidable motion thereon being limited by a pin or pins 29 screwed into the sleeve 22 and engaging in an elongated slot or slots 30 formed in the sleeve 28. The lower end of the latter is provided with an inwardly-turned flange 31 and between the latter and the lower end 32 of the inner sleeve 22 there is inserted a ring 33 of rectangular section made of soft resilient material such as rubber, synthetic rubber or felt.

A coil spring 34 reacts between a shoulder 35 formed in the sleeve 22 and the underside of the piston part 25 and acts to thrust the injector device upwards. The upward motion of the injector device is limited by one or more stops 36 so that the ports 27 are in constant communication with the space 37 between the lower end of the gun shank 23 and the top face of the piston part 25.

As shown in Figure 6, when the nozzle is applied to the nipple the bottom face of the flange 31 bears upon the locating flange 12 of the nipple and thereafter manual pressure applied to the grease gun causes the inner sleeve 22 to move towards the nipple relative to the outer sleeve 28 thereby gripping the ring 33 and causing it to be distorted radially inwards thus crushing the side of the head 14 of the nipple below the ring 19 inwards as shown in dotted lines. This distortion of the nipple head (by leverage effect) causes its top surface to spread and the inlet end of the small size lubricant passage 17 to open. When pressure is applied to the grease by the grease gun some of the grease inside the hollow injector device passes through the ports 27 into the annular space 37 and there, acting upon the piston part 25, thrusts the injector device downwards against the counter action of the spring 34. The pointed end 24 is thus forced into the opened end of the lubricant passage 17 and a charge of grease is injected into the nipple and thence to the place of use.

In the modified form of nozzle shown in Figure 7 the end of the grease gun shank 38 is integral with or fixedly attached to a sleeve 39 the lower end of which is formed with an inwardly-turned flange 40, above which is fixed a ring 41 of soft resilient material such as rubber, synthetic rubber or felt. The skirt 42 of a hollow piston member, which also comprises a crown 43, is slidable in the bore of the sleeve 39.

The hollow injector device is formed with a pointed end 43 and is slidable in a hole 44 formed centrally in the crown 43 of the piston member, the latter also being provided with radial guide wings 45 which are slidably guided in the bore of the skirt 42 of the piston member. A coil spring 46 which reacts between a shoulder 47 in the sleeve 42 and the wings 45 thrusts the injector device upwards away from flange 40 of the sleeve, its upward movement being limited by the shoulder 43a.

As shown in Figure 7, when the gun is in its working position upon the nipple the flange 40 bears upon the flange 12 of the nipple. When pressure is applied to the grease in the grease gun the piston member 42—43 is forced downwards gripping the ring 41 between itself and the flange 40 thus causing it to be distorted radially inwards crushing the side of the nipple head 14 below the ring 19 inwards as shown by the broken lines. The grease pressure also forces the injector member downwards against the spring 46 so that its pointed end 43 enters the opened inlet end of the lubricant passage 17 and a charge of grease is injected into the nipple and thence to a place of use.

In the nozzle shown in Figure 8 the upper end of an inner sleeve 48 is screwed onto the end of the shank 49 of the grease gun nozzle. The lower end 48A of the sleeve 48 is formed with an inwardly-turned flange 49A the purpose of which will be explained hereinafter. An outer sleeve 50 is slidably arranged upon the upper end of the inner sleeve 48, the slidable movement of the outer sleeve being limited by means of a pin or pins 51 which are screwed into the upper end of the sleeve 48 and is or are engaged in an elongated slot or slots 52 formed in the sleeve. The lower end of the sleeve 50 is formed with an inwardly sloping part 48B terminated by a cylindrical flange 53. A number of jaws 54 are loosely attached to the lower part 48A of the inner sleeve 48 at their upper ends and are accommodated in the annular space between the part 48A of the inner sleeve and the conical inner wall 53A of the outer sleeve. The jaws are suspended from the inner sleeve by means of pins 55. The outer sleeve 50 is normally pressed downwards by means of a coil spring 56 which reacts between a shoulder 57 in the outer sleeve and a shoulder 58 on the upper part of the sleeve 48.

In this construction the injector device is constructed like that shown in Figure 6. It comprises a pointed end 59, a piston part 60 which is slidable in the inner sleeve 48—48A and a hollow guide shank 61 which is slidable in the shank 49 of the grease gun nozzle and which is provided with a number of lateral ports 61A. The injector device is normally thrust upwards by means of a spring 62 which reacts between the shoulder 63 in the part 48A of the sleeve 48 and the underside of the piston part 60. The upward movement of the injector device is limited by stops 64 provided on the lower end of the nozzle shank 49.

When the nozzle is in its working position upon the nipple as shown in Figure 8, the end of the flange part 53 of the outer sleeve 50 bears upon the flange 12 of the nipple. The inwardly-turned flange 49A of the inner ring 48 acts as a guide and embraces the nipple head 14, thus centralising the nozzle upon the nipple. When manual thrust is applied to the nozzle the inner sleeve 48—48A with the jaws 54 move downwards relatively to the outer sleeve 50, the conical surface 53A of which acts upon the jaws 54 and forces them inwards. This inward movement of the jaws results in the side of the nipple head being distorted inwards below the reinforcing ring 19 as shown by the broken lines, the inner end of the lubricant passage 17 being thus opened by leverage effect as previously explained. When pressure is applied to the grease in the grease gun the injector device is forced downwards against the action of the spring 62 by reason of the thrust exerted on the piston part 60 by the grease which flows through the ports 61A into the annular space between the upper surface of the piston part and the lower end of the shank 49 of the nozzle.

The modified nozzle shown in Figure 9 comprises a piston member 65B which is slidably arranged within the bore of an enlarged cylindrical part 66 provided at the lower end of the nozzle shank 67. The end of the enlarged part 66 is formed with a sloping part 66A which is terminated by a cylindrical flange 68. A number of jaws 69 are loosely attached to a reduced skirt part 65A of the piston by means of pins 70. The piston is normally thrust upwards by means of a coil spring 71 which is arranged within the enlarged part 66 of the nozzle shank on the underside of the piston member 65B. The injector device is formed with a pointed end 72 and with radial guide wings 73 which are slidable within the bore of the piston member. The upper end of the injector device is slidably guided in a hole 74 formed in the crown 65C of the piston member. A coil spring 75 reacts between a shoulder 76 in the piston skirt 65A and the wings 73 and thus acts to thrust the injector device upwards within the piston, its upward movement being limited by a shoulder 65D.

When the nozzle is applied to the nipple as shown in Figure 9, the end 68 of the enlarged part 66 of the nozzle shank bears upon the flange 12 of the nipple and the inturned flange 77 of the piston skirt 65A acts as a guide. When pressure is applied to the grease in the grease gun the piston member 65A—65B is forced downwards carrying with it the jaws 69. The latter contact with the inner surface of the conical part 66A of the enlargement 66 and are forced radially inwards and act to distort the side of the nipple head below the reinforcing ring 19 as shown by the broken lines and thus to open the inlet end of the lubricant passage 17 by leverage effect. The pressure of the grease also forces the injector device 72 downwards until its pointed end is engaged in the opened inlet end of the passage 17 in the nipple and a charge of grease is injected into the nipple and thence to the place of use.

The nozzle shown in Figure 10 comprises a hollow body 78 integral with a conduit 79 which acts as a handle and is connected to a grease gun or other pressure source (not shown). The upper end of an inner sleeve 81 is screwed on to the lower end of the nozzle body 78 and an outer sleeve 82 is slidably mounted upon the upper part of the inner sleeve. The outer sleeve is formed with a sloping part 83, which is terminated by a cylindrical part 84, and with two longitudinally-spaced collars 85 between which the forked end 86 of a lever 87 is engaged. The lever is pivotally mounted upon a pin 88 fixed upon the conduit 79. The forked end 86 of the lever and thus the outer sleeve 82 are normally forced downwards by a blade spring 89 one end of which is fixed to the conduit 79 while its opposite end thrusts the operating arm of the lever upwards.

A number of jaws 90 are loosely attached at their upper ends to the inner sleeve 81 in the annular space between the latter and the outer sleeve 82.

In this construction the injector device comprises a hollow cylindrical shank 91, which is slidable in the bore 92 of the nozzle body 78, and a piston part 93 which is slidably guided in the bore of the inner sleeve 81. The injector device is provided with a central lubricant passage 94 and with a number of radial ports 95 which provide communication between the passage and outer surface of the shank 91. A coil spring 96 fitted in the inner sleeve acts to thrust the injector device upwards, its upward motion being limited by stops 97 provided on the lower end of the nozzle body 78. The injector device is also formed with a pointed end 98 as in the constructions described above.

When the nozzle is placed in its working position upon the nipple as shown in Figure 10, the lower end of the inner sleeve 81 fits around the nipple head 14 and the cylindrical part 84 of the outer sleve 82 seats upon the nipple flange 12. By pressing the operating arm of the lever 87 towards the conduit 79 the operator causes the outer sleeve 82 to slide upwards relatively to the inner sleeve 81, the sloping part 83 of the outer sleeve thus forcing the jaws 90 inwards to distort the nipple head 14 and to open the inlet end of the lubricant passage 17 by leverage effect as described in reference to the previous constructions.

When pressure is applied to the grease by the grease gun some of the grease is forced out of the passage 94 in the injector device through the ports 95 into the annular space between the lower end of the nozzle body 78 and the top surface of the piston part 93, where, acting upon the latter, it thrusts the injector device downwards against the action of the spring 96. The pointed end of the injector device is thus forced into the opened inlet end of the lubricant passage 17 and grease is injected thereinto as described in reference to previous constructions.

I claim:

1. A resilient, lubricant-impervious closure member, having a generally cylindrical, nozzle-engaging head, a recess within said head, a normally closed lubricant duct in the outer end of said head of no measurable lateral dimension extending between the outer end surface of said head and said recess, and annular rigid fulcrum means engaging the inner periphery of said recess radially of the point at which said duct terminates therein to cause said duct to open when the walls of said recess are constricted on the side of said fulcrum means opposite the outer end of said head.

2. A resilient, lubricant-impervious closure member as defined in claim 1, which comprises a recessed cap adapted to be fitted over the open end of a hollow, lubricant-supply conduit, and wherein the outer end of said conduit forms the said fulcrum means.

3. A resilient, lubricant-impervious closure member having a cylindrical nozzle-engaging head, a recess within said head, a normally closed lubricant duct of no measurable dimension extending between the upper surface of said closure member and the upper part of said recess, a hollow shank portion communicating with the recess in said nozzle-engaging head, and rigid fulcrum means engaging the inner wall of said recess radially of the point at which said duct terminates therein to cause said duct to open when the walls of the recessed portion of said nozzle-engaging head are constricted below the said rigid fulcrum means.

4. A closure for a lubricant receiving passageway comprising a body member of fluid-impervious, resilient, deformable material having a passageway extending axially from end to end thereof including a generally spherical-shaped enlarged portion spaced inwardly of the outer end of said body member and a pierced portion in the outer end portion of said body member of no measurable transverse dimensions when the body member is in relaxed condition extending outwardly from said enlarged portion, and substantially annular rigid means to engage the inner periphery of said enlarged portion in surrounding relation to and spaced axially from the inner terminus of the pierced portion of said passageway to cause the outer end portion of said body member to be deformed in a direction to enlarge the said pierced portion of the passageway radially when said body member is constricted on the side of said rigid means opposite the said inner terminus.

5. A closure for a lubricant receiving passageway comprising a body member of fluid-impervious, resilient, deformable material having a passageway extending axially from end to end thereof including a generally spherical-shaped enlarged portion spaced inwardly of the outer end of said body member and a pierced portion in the outer end portion of the body member of no measurable transverse dimensions when the body member is in relaxed condition extending outwardly from said enlarged portion, said enlarged portion of said passageway having a substantially annular groove in its periphery spaced axially inwardly of the inner terminus of the pierced portion of said passageway, and rigid means to engage in said groove for causing the outer end portion of said body member to be deformed in a direction to enlarge said pierced portion of the passageway radially when said body member is constricted on the side of said rigid means opposite the said inner terminus.

6. A closure for a lubricant receiving passageway comprising a body member of fluid-impervious, resilient, deformable material including a generally cylindrical portion, said body member having a passageway extending axially from end to end thereof including a generally spherical-shaped intermediate enlarged portion and a pierced portion in the outer end portion of said body member of no measurable transverse dimensions when the body member is in relaxed condition extending outwardly from said enlarged portion, and substantially annular nondeformable means substantially concentric with the inner terminus of the pierced portion of said passageway and of a diameter less than the maximum diameter of said enlarged portion of the passageway engaging the inner periphery of the said enlarged portion axially inwardly of the inner terminus of the said pierced portion, said annular means forming a stretcher across which the outer end portion of said body member is deformed to enlarge the pierced opening radially when said body member is constricted over the enlarged portion of a passageway on the side of said annular means opposite the said inner terminus.

7. A closure for a lubricant receiving passageway, comprising a body member of resilient, fluid-impervious, deformable material including a shank for anchoring said body member in a passageway and a generally cylindrical head, said body member having a passageway extending axially from end to end thereof including a generally spherical-shaped enlarged portion spaced inwardly of the outer end of said head and a pierced portion of no measurable transverse dimensions when the body member is in relaxed condition extending through said head outwardly from said enlarged portion, said enlarged portion of said passageway having a substantially concentric groove in its periphery spaced axially inwardly of the inner terminus of the pierced portion of the passageway, and a rigid ring engaged in said groove to cause the outer end portion of said head to be deformed in a direction to enlarge the said pierced portion of the passageway radially when said head is constricted on the side of said ring opposite the said inner terminus.

8. A closure for a lubricant receiving passageway, comprising a body member of resilient fluid-impervious, deformable material including a shank for anchoring said body member in a passageway and a generally cylindrical head, said body member having a passageway extending axially from end to end thereof including a generally spherical-shaped enlarged portion spaced inwardly of the outer end of said head and a pierced portion of no measurable transverse dimensions when the body member is in relaxed condition extending through said head outwardly from said enlarged portion, said enlarged portion of said passageway having a substantially concentric groove in its periphery spaced axially inwardly of the inner terminus of the pierced portion of the passageway, a rigid ring engaged in said groove to cause the outer end portion of said head to be deformed in a direction to enlarge the said pierced portion of the passageway radially when said head is constricted on the side of said ring opposite the said inner terminus, and a radially enlarged flange at the base of said head to limit movement of said body member inwardly of the lubricant receiving passageway and provide a seat for the dispensing nozzle of a lubricant supply.

9. A lubricant receiving fitting comprising a rigid body member having a shank for anchoring the fitting in a lubricant receiving passageway and a tubular extension projecting outwardly relative to said shank, said body member having a continuous passageway which extends through said shank and extension, and a closure for the passageway in said fitting, comprising a generally cylindrical body of resilient, fluid-impervious, deformable material having an axial passageway including an intermediately located generally spherical-shaped portion of larger diameter than said extension, a normally closed pierced portion in the outer end portion of said closure extending outwardly from said enlarged portion, and a portion in the opposite end of said closure extending from said enlarged portion in a direction opposite to said pierced portion and of a diameter snugly to grip the extension when telescoped over the same, said extension engaging the inner periphery of the spherical enlarged portion of the passageway inwardly of the inner terminus of the said pierced portion of the passageway and substantially concentrically relative thereto when the parts are telescoped to provide a rigid substantially circular stretcher across which the outer end portion of said closure is deformed to enlarge the said pierced portion of the passageway radially when the closure is constricted along the portion thereof in which the cross-sectional area of the spherical portion of the passageway exceeds the cross-sectional area of the extension.

10. A lubricant receiving fitting comprising a rigid body member having a shank for anchoring the fitting in a lubricant receiving passageway and an extension projecting outwardly relative to said shank, said body member having a continuous passageway therethrough, and a closure for the passageway comprising a generally cylindrical body of resilient, fluid-impervious, deformable material having an axial passageway including an intermediate portion of larger diameter than said extension, a normally closed pierced portion extending through the outer end portion of the closure and terminating at its inner end in a part of progressively increasing cross-sectional area merging with the enlarged portion of the passageway, and a portion in the opposite end of said closure extending from the said enlarged portion in a direction opposite to the said pierced portion and formed snugly to grip the extension when the closure is telescoped over the same, said part of the passageway of increasing cross-sectional area having a groove formed therein substantially concentric with the inner terminus of the pierced portion of the passageway, the outer end of said extension engaging in said groove when the closure is telescoped upon said extension to form a stretcher across which the outer end portion of the closure is deformed to enlarge the pierced opening therein radially when the closure is constricted along the enlarged portion of the passageway.

11. A lubricant receiving fitting comprising a rigid body member having a shank for anchoring the fitting in a lubricant receiving passageway, a head and a tubular extension projecting outwardly from said head, said body member having a continuous passageway therethrough, and a closure for the said passageway comprising a generally cylindrical body of resilient, fluid-impervious, deformable material having an axial passageway including an intermediate portion of larger diameter than said extension, a normally closed pierced portion extending through the outer end portion of the closure and terminating at its inner end in a part of progressively increasing cross-sectional area merging with the enlarged portion of the passageway, and a portion in the opposite end of said closure extending from the said enlarged portion in a direction opposite to the said pierced portion and formed snugly to grip the extension when the closure is telescoped over the same, said part of the passageway of increasing cross-sectional area having a groove formed therein substantially concentric with the inner terminus of the pierced portion of the passageway, the outer end of said extension engaging in said groove when the closure is telescoped upon said extension to form a stretcher across which the outer end portion of the closure is deformed to enlarge the pierced opening therein radially when the closure is constricted along the enlarged portion of the passageway, said head limiting telescopic movement of the closure upon the rigid body of the fitting and providing a seat for the dispensing nozzle of a lubricant supply.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 120,693 | Wood | Nov. 7, 1871 |
| 660,894 | Ernst | Oct. 30, 1900 |
| 2,235,238 | Forsberg | Mar. 11, 1941 |